United States Patent
Esquibel et al.

(10) Patent No.: US 6,914,624 B1
(45) Date of Patent: Jul. 5, 2005

(54) ADAPTIVE AND LEARNING SETTING SELECTION PROCESS FOR IMAGING DEVICE

(75) Inventors: Daniel M Esquibel, Denver, CO (US);
Mark D Seaman, Greeley, CO (US);
Paul M Hubel, Mt View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 807 days.

(21) Appl. No.: 09/712,578

(22) Filed: Nov. 13, 2000

(51) Int. Cl.[7] .............................................. H04N 5/225
(52) U.S. Cl. ................. 348/207.99; 348/297; 348/362; 348/363; 348/655; 396/439
(58) Field of Search ................................ 348/143, 373, 348/653, 479, 110, 296, 297, 313, 153, 603, 602, 180, 175, 177, 187, 362–365; 355/18, 39, 40, 41; 358/479

(56) References Cited

U.S. PATENT DOCUMENTS

| | | | |
|---|---|---|---|
| 4,131,919 A | | 12/1978 | Lloyd et al. .................... 360/9 |
| 4,420,773 A | | 12/1983 | Toyoda et al. ............... 358/335 |
| 4,541,010 A | | 9/1985 | Alston .......................... 358/44 |
| 4,616,916 A | * | 10/1986 | Someya et al. .............. 396/243 |
| 5,159,364 A | * | 10/1992 | Yanagisawa et al. .......... 396/76 |
| 5,359,385 A | * | 10/1994 | Ishida et al. ................... 396/49 |
| 5,479,206 A | * | 12/1995 | Ueno et al. ............... 348/211.5 |
| 5,631,699 A | * | 5/1997 | Saito ........................ 348/211.6 |
| 5,774,746 A | * | 6/1998 | Kirigaya et al. ............... 396/49 |
| 5,883,666 A | * | 3/1999 | Kyuma et al. ........... 348/229.1 |
| 6,005,613 A | * | 12/1999 | Endsley et al. .......... 348/231.6 |
| 6,160,960 A | * | 12/2000 | Mikoshiba et al. ........... 396/61 |
| 6,623,528 B1 | * | 9/2003 | Squilla et al. ............... 715/523 |
| 6,665,015 B1 | * | 12/2003 | Watanabe et al. ........... 348/362 |

* cited by examiner

Primary Examiner—Wendy R. Garber
Assistant Examiner—Chriss S. Yoder

(57) ABSTRACT

A method of configuring settings in an imaging device includes retrieving the previous state of a plurality of settings in the imaging device. The new state of the settings in the imaging device are determined. The new state is combined with the previous state to form an optimal state of the settings. The imaging device is then configured with the settings according to the optimal state.

19 Claims, 9 Drawing Sheets

ADAPTIVE AND LEARNING SETTING SELECTION PROCESS FOR IMAGING DEVICE

FIELD OF THE INVENTION

The present invention relates generally to the field of imaging, and more particularly, to an adaptive and learning process for selecting settings in an imaging device.

BACKGROUND OF THE INVENTION

Nearly all modern imaging devices have multiple settings which are controlled electronically. Purely mechanical controls in imaging devices have become extremely rare. Electronic settings controls in imaging devices provide much greater ease of use and improved image quality for the amateur user, since they can be preprogrammed for a number of different environments. For example, most modern cameras, whether film or digital cameras, have several modes with preprogrammed settings, such as for low light nighttime photography or for high speed sports photography. In each mode settings for exposure time, f-stop, etc are predetermined and programmed into the camera. These preprogrammed modes allow the user to take reasonably good pictures in a number of general types of environments.

In addition, many imaging devices allow the user to manually adjust one or more of the settings in order to deviate from the preprogrammed modes and settings. This allows the more experienced user to increase the quality of the images when none of the preprogrammed modes are well suited to the environment. In fact, with the unlimited variation in environment and the small number of preprogrammed modes in most imaging devices, it is unlikely that a preprogrammed mode will provide the best possible image quality. Furthermore, user's tastes in images vary widely, making it difficult or impossible to program settings which will most please every user.

As digital imaging devices have become increasingly popular, the problem is exacerbated, since digital cameras typically have more settings to adjust than film cameras. For example, digital imaging devices have a white balance setting, which is used to prevent color shifts, ensuring that white objects actually appear white. Thus, even though the number of preprogrammed modes may remain the same in digital cameras as in film cameras, the number of settings to be programmed for each mode is greater. This further decreases the likelihood that the preprogrammed settings will provide the preferred image for every user in a given environment.

Digital cameras are well known in the art and various components thereof are described in U.S. Pat. No. 4,131,919, U.S. Pat. No. 4,420,773, and U.S. Pat. No. 4,541,010, all of which are hereby incorporated by reference for all that they disclose.

Digital cameras require a high level of interaction with the user. There are a large number of settings that may be adjusted to optimize and personalize the resulting image quality. However, the process of adjusting the settings can be cumbersome and confusing to the user. The typical user may not understand many of the settings and how they affect the picture. In addition, the user usually needs settings optimized for only a few situations, and may be satisfied with the preprogrammed modes in other environments.

A need therefore exists for a method of adjusting settings in an imaging device which solves some or all of the above problems.

SUMMARY

To assist in achieving the aforementioned needs, the inventors have devised an adaptive and learning setting selection method for imaging devices. This causes an imaging device to adapt to user preference over time. As the user adjusts settings in the imaging device, the new settings are combined with previous settings as points in settings space, forming a cluster of points. The camera then finds the optimal point in the cluster and uses the point to set camera options. Each mode in the camera thus develops a cluster of points in settings space, so that the optimal point changes as user preferences change. In addition, new modes may be formed in the camera when user settings differ to a large degree from settings in any predefined mode.

The invention may comprise a method of configuring settings in an imaging device. The method includes retrieving the previous state of a plurality of settings in the imaging device. The new state of the settings in the imaging device are determined. The new state is combined with the previous state to form an optimal state of the settings. The imaging device is then configured with the settings according to the optimal state.

The invention may also comprise an electronic imaging device having an imaging system and computer readable program code. The computer readable program code includes code for retrieving at least one previous state of a plurality of settings in the imaging device, for determining a new state of the plurality of settings, and code for combining the at least one previous state with the new state to form an optimal state. The computer readable program code also includes code for configuring the settings in the imaging device according to the optimal state.

The invention may also comprise a digital imaging apparatus having means for selecting a mode, means for adjusting a plurality of settings, and means for tracking user preferences in the plurality of settings.

BRIEF DESCRIPTION OF THE DRAWING

Illustrative and presently preferred embodiments of the invention are shown in the drawing, in which.

DESCRIPTION OF THE PREFERRED EMBODIMENT

Figure 1:
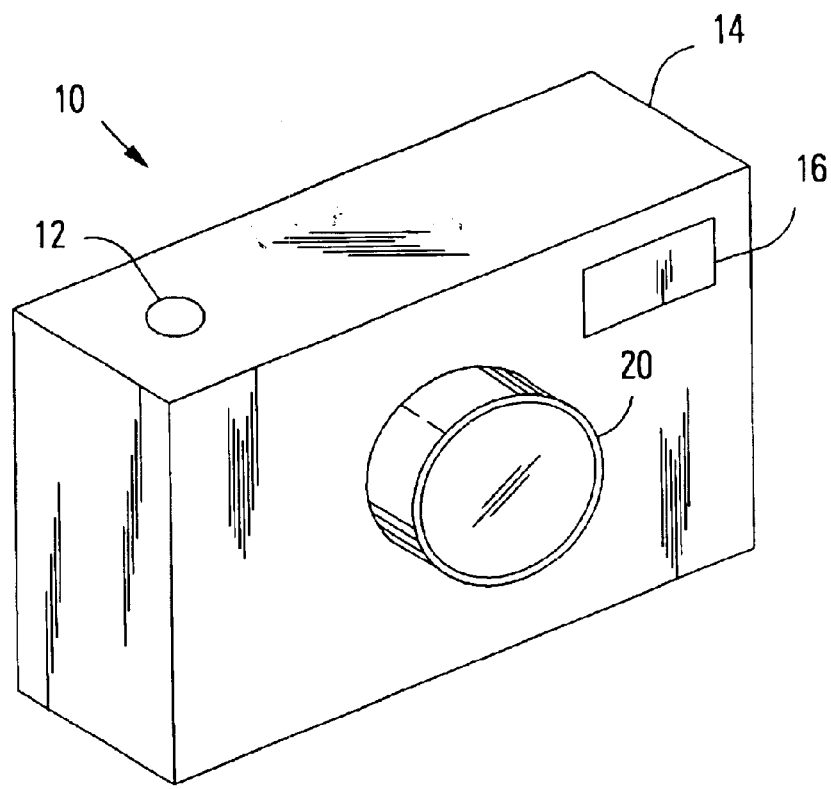
FIG. 1 is a perspective front view of a digital camera.

The drawing and description, in general, disclose a method of configuring settings in an imaging device. The method includes retrieving the previous state of a plurality of settings in the imaging device. The new state of the settings in the imaging device are determined. The new state is combined with the previous state to form an optimal state of the settings. The imaging device is then configured with the settings according to the optimal state.

The drawing and description also disclose an electronic imaging device having an imaging system and computer readable program code. The computer readable program code includes code for retrieving at least one previous state of a plurality of settings in the imaging device, for determining a new state of the plurality of settings, and code for combining the at least one previous state with the new state to form an optimal state. The computer readable program code also includes code for configuring the settings in the imaging device according to the optimal state.

The drawing and description also disclose a digital imaging apparatus having means for selecting a mode, means for adjusting a plurality of settings, and means for tracking user preferences in the plurality of settings.

An adaptive and learning setting selection process may be included in any imaging device having at least one user adjustable setting, such as exposure time or aperture. The adaptive and learning setting selection process enables the imaging device to track or follow user preferences for these settings. Each time the user makes adjustments to the settings in the imaging device, the new values are accumulated so that the imaging device can learn and adapt to the user preferences. The imaging device then combines new user adjusted settings with accumulated previous settings to calculate optimal settings for the user. The imaging device is then configured according to the optimal settings.

For imaging devices having multiple modes, the accumulated values are stored according to the current mode. For example, an imaging device may have a sports mode and a normal mode, where the sports mode has a lower exposure time than the normal mode in order to capture high speed activities without motion blur. User adjusted settings are associated with a particular mode, so that each mode tracks user preferences for a certain environment.

The adaptive and learning setting selection process in an imaging device provides great benefits such as simplifying use and improving image quality for a given user. With the adaptive and learning setting selection process, the imaging device learns as the user adjusts settings. The imaging device thus becomes personalized, creating images which correspond much more closely to user preferences than those created with static, preprogrammed settings. The adaptive and learning setting selection process can also create new modes on the imaging device when the user adjusted settings differ greatly from settings in existing modes. For example, an imaging device may be preprogrammed with a sports mode for high speed imaging. If the user changes settings to create images of winter sports activities having a brilliant snowy background, the adaptive and learning setting selection process may create a new mode to capture high speed images that are not overexposed and washed out.

The adaptive and learning setting selection process also greatly simplifies adjustment of settings in the imaging device. The settings in the imaging device are defaulted to previous optimal settings based on user preferences. Therefore, the user will typically have fewer changes to make in a new environment than if the settings were preprogrammed to a factory default.

The adaptive and learning setting selection process may also simplify settings selection by presenting a group of sample images, each created with different possible settings. The user may then simply select the preferred image, rather than blindly adjusting settings manually. Typical users do not fully understand the settings and how they affect resulting images in a given imaging device without a great deal of practice. By presenting sample images, the adaptive and learning setting selection process allows the user to adjust settings much more easily.

Typical types of imaging devices which may benefit from the adaptive and learning setting selection process include digital cameras 10 (FIG. 1). Digital cameras 10 are well-known in the art and are analogous to ordinary film-type cameras, except that the film is replaced with a photoelectric detector (e.g., a charge coupled device (CCD)). The photoelectric detector converts the light received by the camera into electronic signals, which may be digitized and stored as digital image data. For example, the resulting digital image data may be stored in an electronic memory system, such as random access memory (RAM), or may be stored on a magnetic or optical disk of the type commonly used to store digital data.

Digital cameras 10 offer considerable advantages over conventional film-type cameras in that the digital image data may be stored, processed, and/or reproduced with ease. The relative ease of handling and processing the digital image data produced by digital cameras allows users to readily enlarge, reduce, crop, or otherwise modify the digital image data to create any of a wide range of photographic effects and styles, as well as to easily capture the image of a document and convert text in the image to a text file.

Before describing the adaptive and learning setting selection process in more detail, an exemplary digital camera 10 which may employ the adaptive and learning setting selection process will be described. However, it is important to note that the adaptive and learning setting selection process is not limited to any particular type of imaging device. For example, the imaging device may also comprise a scanner.

Figure 2:
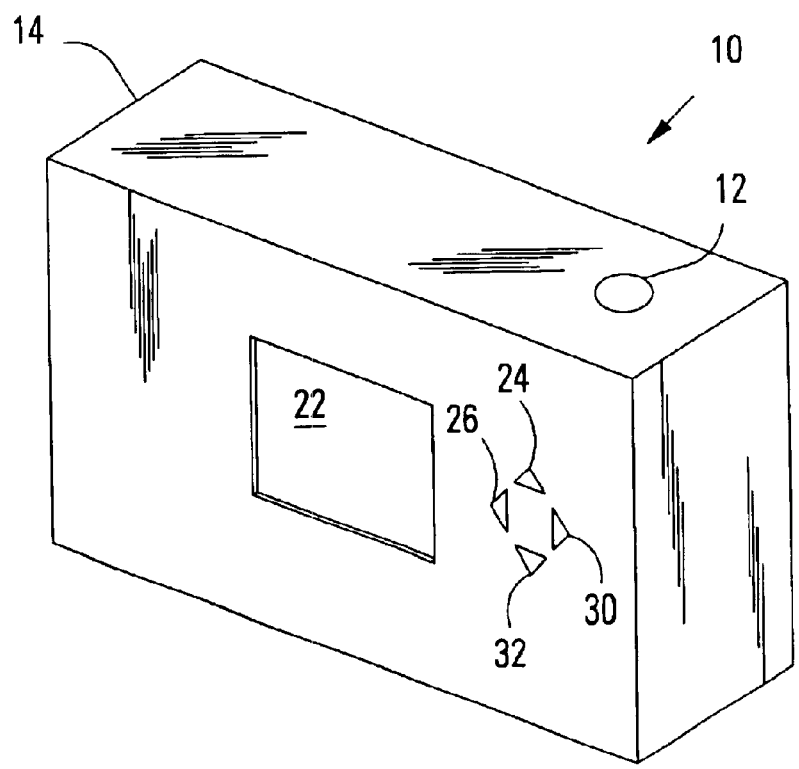
FIG. 2 is a perspective rear view of the digital camera of FIG. 1.

A digital camera 10 (FIGS. 1 and 2) includes an optical imaging assembly to convert image light to electronic image data, a storage device to store the image data, and a control system, all contained in a housing 14. The control system provides a user interface, controls the optical imaging assembly, and processes and formats the image data. The control system also implements the adaptive and learning setting selection process by accepting user adjusted settings, accumulating previous settings, calculating optimal settings and configuring the optical imaging assembly according to the optimal settings. A lens 20 in the optical imaging assembly is located in the housing 14 to allow light to enter the digital camera 10. Control buttons, such as a shutter control button 12 and navigation buttons 24, 26, 30, and 32, are provided on the outside of the housing 14. The digital camera 10 preferably includes an illumination system such as a flash 16 mounted on the outside of the housing 14. A display device 22 is also located on the outside of the housing 14. The digital camera 10 also includes a power source such as a battery. Each of the foregoing systems and devices will now be described in detail.

The housing 14 of the digital camera 10 comprises a generally rectangularly shaped structure sized to receive the various internal components of the camera 10. The housing 14 is sized to receive the optical imaging assembly, which includes a lens 20 and an electrical photodetector. The lens 20 is preferably telecentric or near telecentric. The photodetector detects image light focused thereon by the lens 20 and comprises a CCD, although other devices may be used. A typical CCD comprises an array of individual cells or "pixels," each of which collects or builds-up an electrical charge in response to exposure to light. Since the quantity of the accumulated electrical charge in any given cell or pixel is related to the intensity and duration of the light exposure, a CCD may be used to detect light and dark spots on an image focused thereon.

The term "image light" as used herein refers to the light that is focused onto the surface of the detector array by the lens 20. The image light may be converted into digital signals in essentially three steps. First, each pixel in the CCD detector converts the light it receives into an electric charge. Second, the charges from the pixels are converted into analog voltages by an analog amplifier. Finally, the analog voltages are digitized by an analog-to-digital (A/D) converter. The digital data then may be processed and/or stored as desired.

The storage device in the digital camera 10 stores the image data collected by the optical imaging assembly. The storage device preferably comprises a random access memory (RAM), or may comprise a magnetic, optical, or other solid state storage medium.

The control system in the digital camera 10 provides a user interface, controls the optical imaging assembly, and processes and formats the image data, either before or after storage in the storage device. The control system also implements the adaptive and learning setting selection process. The control system preferably comprises a microprocessor and associated memory. Alternatively, the control system may comprise a hardcoded device such as an application specific integrated circuit (ASIC).

The display device 22 in the digital camera 10 is a liquid crystal display (LCD) or any other suitable display device. The digital camera 10 also includes other components, such as a battery system. However, since digital cameras are well-known in the art and could be easily provided by persons having ordinary skill in the art after having become familiar with the teachings of the present invention, the various systems and devices of a digital camera 10 that may be utilized in one preferred embodiment of the present invention will not be described in further detail herein.

During operation of the digital camera 10, the camera 10 is oriented with the lens 20 directed at a subject. The mode is selected and the settings are adjusted as desired by the user. The mode and settings are adjusted with the navigation buttons 24, 26, 30, and 32 or by any other suitable means, such as with a computer attached to the digital camera 10. The adaptive and learning setting selection process then calculates optimal settings and configures the digital camera 10 with the optimal settings, as will be described in greater detail hereinafter. (The optimal settings may be overridden by the user if desired.) The subject may be monitored either through a viewfinder (not shown) or on the display panel 22. When the digital camera 10 is properly oriented, the shutter control button 12 is pressed. The photodetector converts the image light directed thereon by the lens 20 into electrical image data, which are stored in the storage device. The control system then processes the image data and displays the captured image on the display panel 22.

Figure 3:
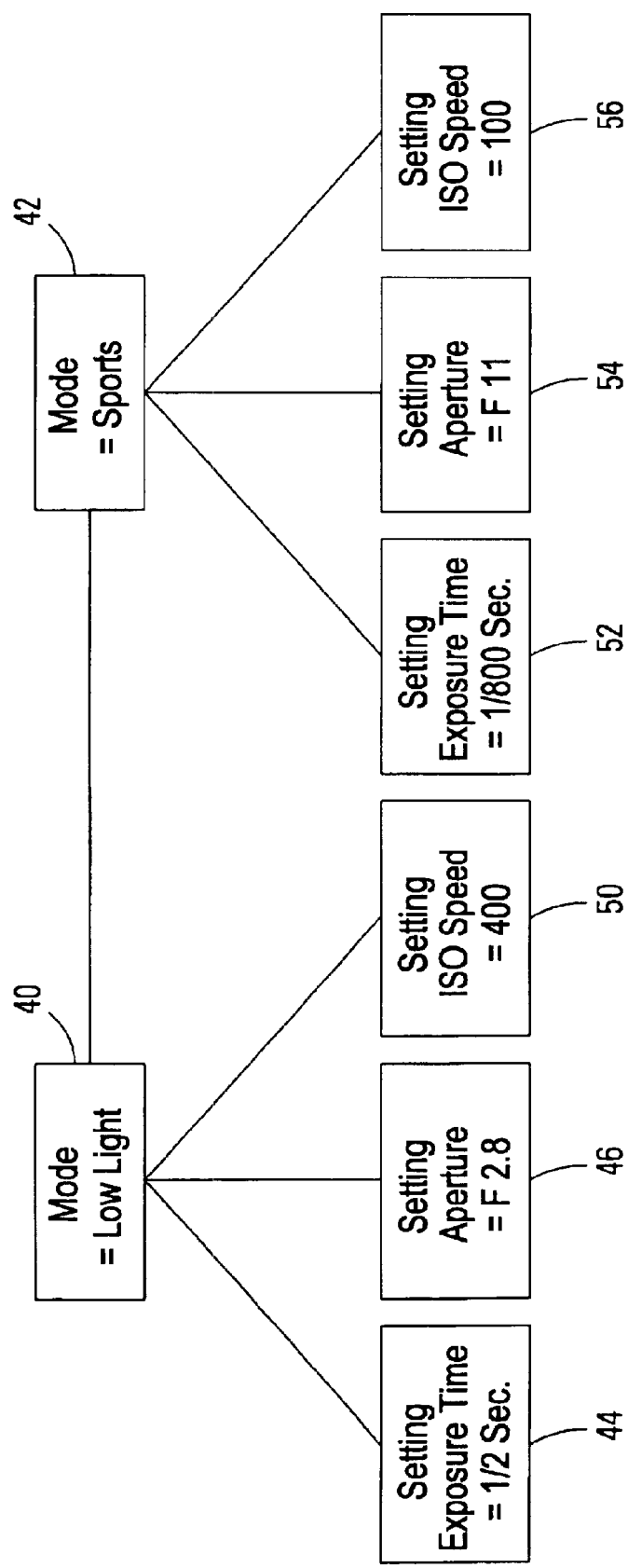
FIG. 3 is a diagram illustrating the hierarchy of modes and settings in an imaging device.

Before continuing with the description of the adaptive and learning setting selection process, the relationship between modes and settings will be defined. The mode is a configurable state of the imaging device which is chosen according to the subject characteristics, such as brightness and speed of movement. Settings are used to control each adjustable parameters of the imaging device, such as aperture size and exposure time. For each mode, the settings are configured with values which produce an acceptable image given the subject characteristics. The hierarchy of modes (e.g., 40 and 42) and settings (e.g., 44–50, 52–56) in the digital camera 10 is illustrated in FIG. 3. Each mode 40 and 42, such as low light and sports, respectively, contains a group of settings 44–50 and 52–56. Exemplary settings in the digital camera 10 include exposure time 44 and 52, aperture 46 and 54, and ISO speed 50 and 56. For example, if the digital camera 10 is in the low light mode 40 shown in FIG. 3, the exposure time setting 44 is ½ second, the aperture setting 46 is f2.8, and the ISO speed setting 50 is 400. If the digital camera 10 is in the sports mode 42, the exposure time setting 52 is ⅛₀₀ second, the aperture setting 54 is f11, and the ISO speed setting 56 is 100.

Settings may be adjusted in several ways according to the adaptive and learning setting selection process. Settings may be entered by the user directly on the digital camera 10, e.g., by pressing the control buttons 24–32. Settings may also be entered on a computer which transmits the settings values to the digital camera 10.

Alternatively, settings may be adjusted by presenting sample images to the user, one of which is chosen as having the preferred image characteristics. In this case, a set of sample images is prepared, preferably all having the same subject matter. Each of the sample images is prepared to illustrate the effects of different settings values. For example, a set of three sample images may be prepared having three different exposure times. The user would then choose one of the three sample images, and the exposure setting on the digital camera 10 would be set to the exposure setting used to prepare the chosen sample image. The sample images may be displayed in any suitable manner, such as simultaneously or one after the other. The sample images may be displayed on the display panel 22, on a remote computer screen, or on a printed page.

Figure 4:
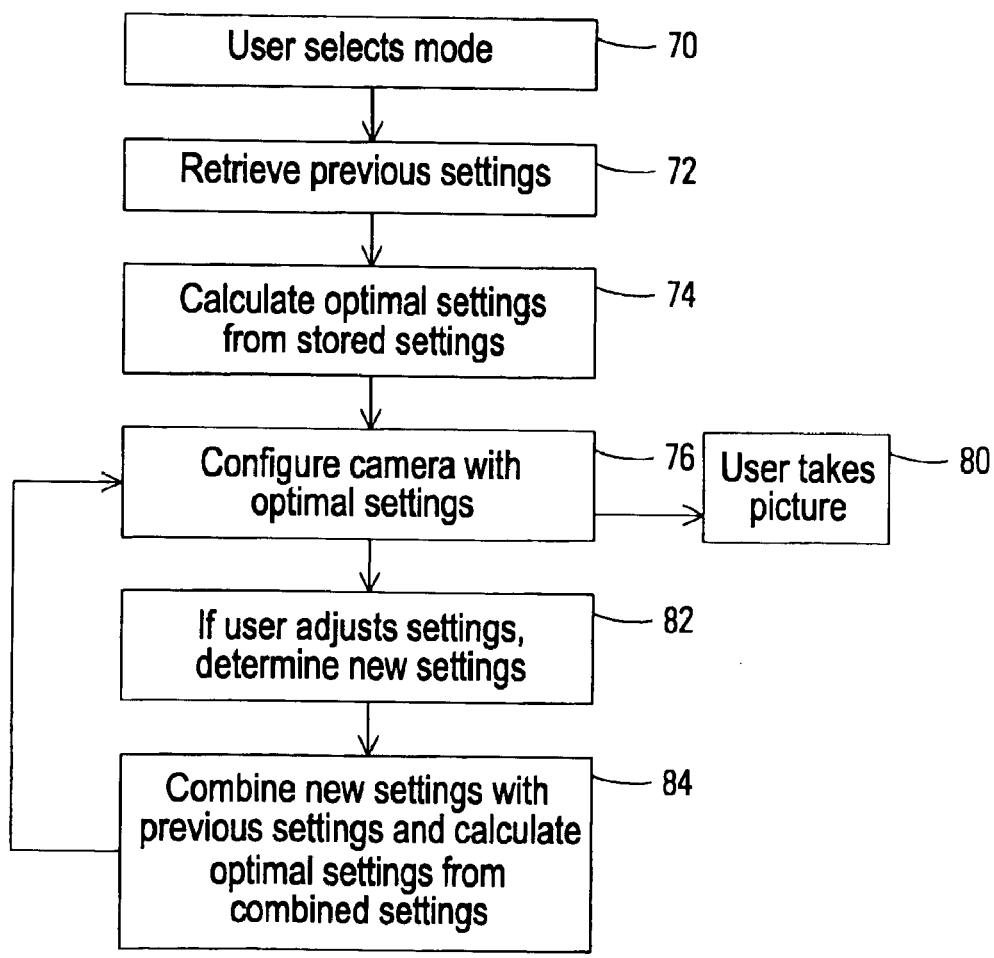
FIG. 4 is a flow chart illustrating a basic adaptive and learning setting selection process in an imaging device.

Referring now to FIG. 4, an overview of the adaptive and learning setting selection process in operation in the digital camera 10 will be given. As a mode is selected 70, a group of previous settings are retrieved 72 for that mode. Optimal settings are calculated 74 to represent the group of previous settings. The digital camera 10 is then configured 76 according to the retrieved previous optimal settings. If the user manually adjusts 82 some of the settings, the new settings are combined 84 with the previous settings to and new optimal settings are calculated based on the combined new and previous settings. The digital camera 10 is then reconfigured 76 with the new optimal settings. Thus, each time the user manually adjusts 82 settings on the digital camera 10, the camera 10 is learning the preferences of the user. Over time, user adjusted settings are combined or averaged to focus in on user preferences. The user may take a picture 80 at any time after the camera is configured 76 with the optimal settings, whether new manually adjusted settings have been entered 82 or not.

Note that one or more settings may remain automatic in the digital camera 10, or all may be manually set. For example, the exposure time setting is often automatic in imaging devices, subject to an internal light meter. In this case, it may be desirable to exclude the automatic settings from the adaptive and learning setting selection process. In other words, automatic settings would not be included in the calculation for optimal settings. However, under some conditions, such as in a portrait studio, the lighting is controlled and the user may wish to manually control all settings in a digital camera 10, including exposure time. In this case, all settings would be included in the adaptive and learning setting selection process.

Note also that the digital camera 10 may be provided with an entirely manual mode, in which the adaptive and learning setting selection process is overridden and manually adjusted settings are directly used to configure the digital camera 10, rather than calculating and using optimal settings.

Three preferred embodiments of the adaptive and learning setting selection process will now be discussed. In the first, multiple previous states are accumulated in the digital camera 10 (see FIGS. 5–8), and the digital camera 10 is configured with optimal settings as soon as they are calculated. In the second, multiple previous states are accumulated in the digital camera 10 (see FIGS. 5–8), and the digital camera 10 is configured with optimal settings after a mode change or the digital camera 10 is again turned on. In the third, only the most recent previous state is kept (see FIG. 9).

The first preferred embodiment of the adaptive and learning setting selection process will now be described. In this embodiment, the digital camera 10 accumulates previous settings as points in a settings space. The settings space is a multidimensional space in which each dimension in the settings space is defined by one of the settings in the digital camera 10. Points in settings space are preferably grouped in clusters according to different modes on the digital camera 10.

Figure 5:
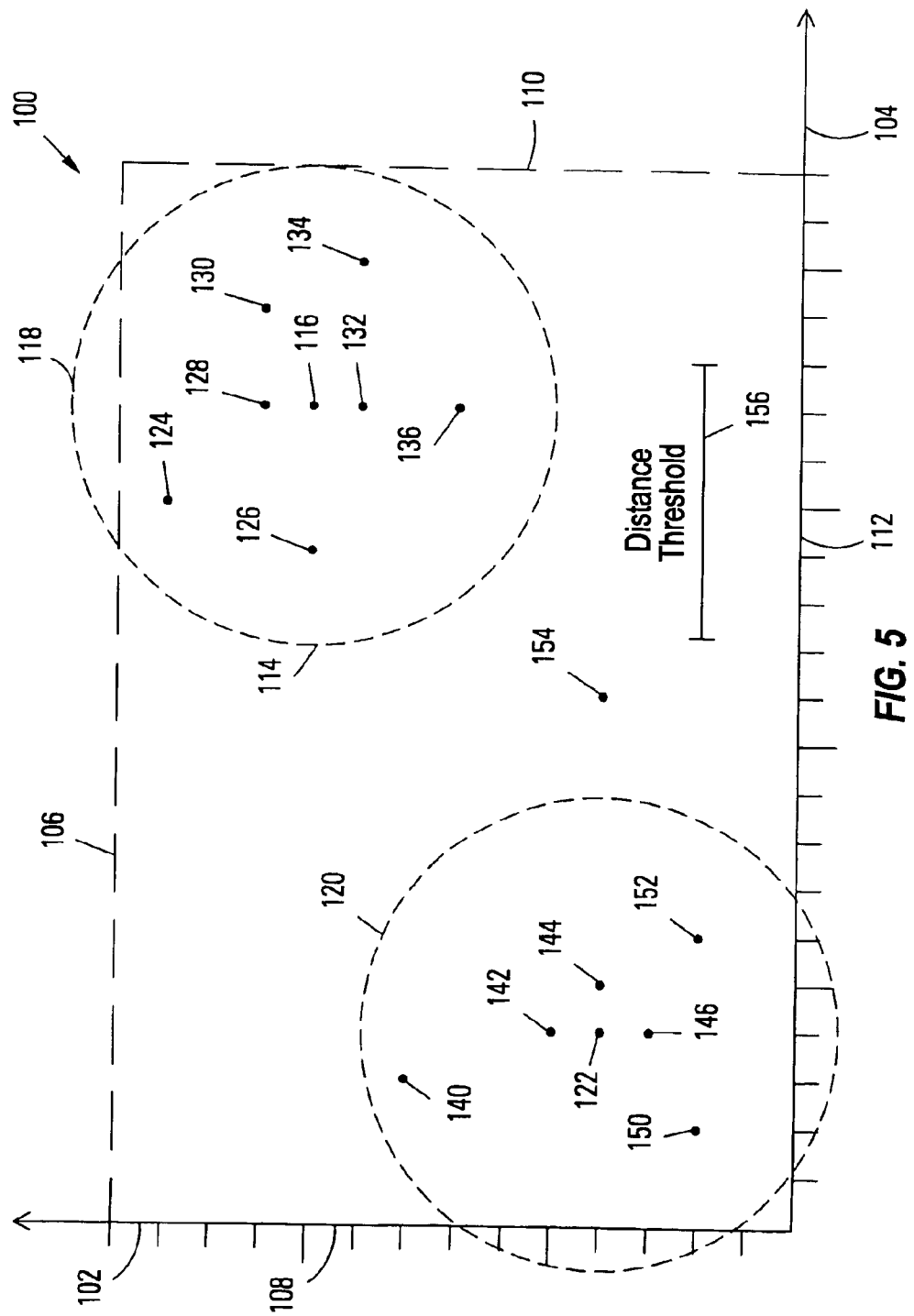
FIG. 5 is a graph of a two-dimensional settings space having multiple clusters made up of settings points.

An exemplary settings space 100 is illustrated in FIG. 5. In this example, the digital camera 10 has two settings which are included in the adaptive and learning setting selection process. Each different state of the two settings in the digital camera 10 may be represented as a point in a two dimensional settings space 100. The settings space 100 is illustrated in a graph in which the first axis 102 represents the first setting and the second axis 104 represents the second setting. (For example, the two settings could be exposure time and aperture setting.)

The settings space 100 is bounded on four sides 106, 108, 110, and 112. The position of the boundary is determined by the acceptable range of settings in the digital camera 10. The top boundary 106 and bottom boundary 112 are established by the upper and lower limits, respectively, of the first setting. The left boundary 108 and right boundary 110 are established by the upper and lower limits, respectively, of the second setting.

In this example, the digital camera 10 has two modes, each having a cluster 114 and 120 of points (e.g., 124 and 140). The first cluster 114 of points is associated with the first mode, and the second cluster 120 of points is associated with the second mode. That is, the points in the first cluster 114 were stored while the digital camera 10 was in the first mode, with only small manual adjustments were made to the settings. The points in the second cluster 120 were stored while the digital camera 10 was in the second mode, with only small manual adjustments made to the settings. The digital camera 10 is preferably preprogrammed with a settings point for each mode by the manufacturer. This allows the digital camera 10 to be configured with suitable initial settings in each mode, before the adaptive and learning setting selection process personalizes the digital camera 10 according to user preferences.

The optimal point of a cluster is used to find the best representation of a users preferences. As the user manually adjusts settings, adding settings points to a cluster, the cluster will become increasingly dense with points and the optimal point in the cluster will become an increasingly good representation of the users preferences. The optimal point of a cluster is preferably the arithmetic mean of the cluster, as this calculation can be done rapidly by a simple processor. Alternatively, other algorithms for calculating an optimal point to represent a cluster may be used. For example, the median may be used, which is less sensitive to outlying settings points in a cluster than the mean, although it is not as simple to calculate.

Figure 6:
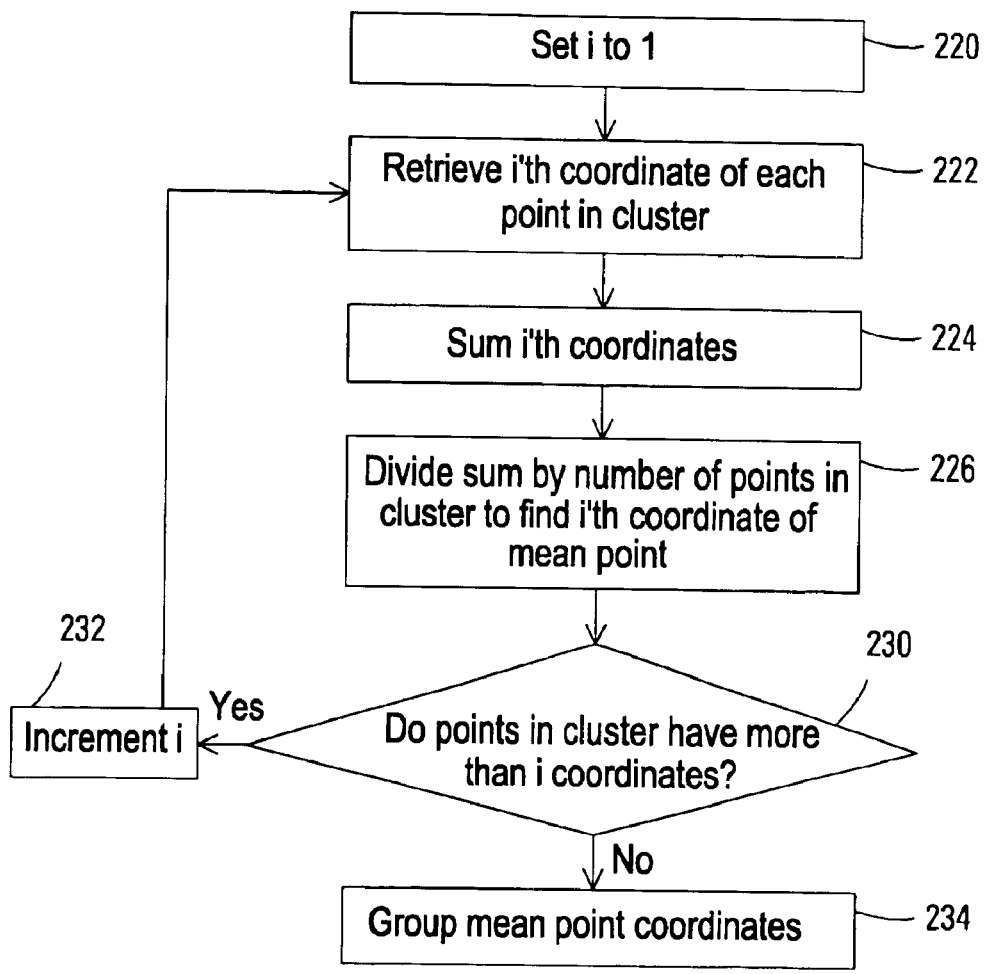
FIG. 6 is a flow chart illustrating the process of locating an optimal point representing a cluster.

The process for finding the optimal point of a cluster as the arithmetic mean is illustrated in the flow chart of FIG. 6. The arithmetic mean is the average of the settings points in the cluster. Each coordinate of each settings point in the cluster is averaged, and the resulting averaged coordinates combine to form the location of the optimal point. This process may be accomplished by first setting 220 a variable i to 1. The i'th coordinate of each point in the cluster is retrieved 222 and summed 224. The sum is divided 226 by the number of points in the cluster to produce the i'th coordinate of the mean point. If points in the cluster have more than i coordinates 230, then i is incremented 232, and the process is repeated starting by retrieving 222 the new i'th coordinates. Once all the coordinates of the mean point are calculated, they are grouped 234 to form the location of the optimal point.

For example, referring to FIG. 5, the first cluster 114 consists of seven settings points, point 124 at (15,13), point 126 at (14,10), point 128 at (17,11), point 130 at (19,11), point 132 at (17,9), point 134 at (20,9), and point 136 at (17,7). Note that the values and units shown here are arbitrary and are normally based on the actual settings in a digital camera 10. They may be represented as an 8-bit digital number from 0 to 255, or as a set of acceptable settings values such as f-stop numbers, or in any other suitable manner. To calculate the location of the optimal point 116 in the first cluster 114, the first coordinates of each settings point in the cluster are summed, then divided by the number of points in the cluster: (15+14+17+19+17+20+17)/7=17. The second coordinates of each settings point in the cluster are then summed and divided by the number of points in the cluster: (13+10+11+11+9+9+7)/7=10. The resulting coordinates are then grouped as the location of the optimal point 116: (17,10). Note that the coordinates of the optimal point may need to be rounded to the nearest acceptable settings value for the digital camera 10.

Similarly, the second cluster 120 consists of six settings points, point 140 at (3,8), point 142 at (4,5), point 144 at (5,4), point 146 at (4,3), point 150 at (2,2), and point 152 at (6,2). The first coordinates of each settings point in the cluster are summed, then divided by the number of points in the cluster: (3+4+5+4+2+6)/6=4. The second coordinates of each settings point in the cluster are then summed and divided by the number of points in the cluster: (8+5+4+3+2+2)/6=4. The resulting coordinates are then grouped as the location of the optimal point 122: (4,4).

The settings space is not limited to the two dimensional example described herein. In practice, a multidimensional settings space includes one dimension for each setting on the digital camera 10 which is to be included in the adaptive and learning setting selection process.

Points (e.g., 124 and 140) in settings space 100 may be clustered, or arranged into clusters, in any suitable fashion. A number of suitable mathematically intensive but effective clustering algorithms are well known. The preferred method, and perhaps the simplest, is to preprogram an initial point in each cluster as mentioned above. Thereafter, a new point is included in a cluster if it is within a predetermined threshold distance 156 of the optimal point in a cluster. For example, the point 126 is within the threshold distance 156 from the optimal point 116 of the first cluster 114, but outside the threshold distance 156 from the optimal point 122 of the second cluster 120. Therefore, the point 126 will be stored with the first cluster 114.

The point 154 is outside the threshold distance of both clusters 114 and 120, so a new cluster and mode will be created containing the point 154. Note that this means that if the digital camera 10 is placed into a certain mode and the settings are drastically manually adjusted, the mode may be changed or a new mode can be created based on the new settings.

If a new settings point is within the threshold distance of the optimal point of more than one cluster, it is included in the closest cluster.

Note also that the boundary of a cluster (e.g., 114), defined by the threshold distance 156 from the optimal point (e.g., 116), may fall in part outside of the settings space 100 if the optimal point 116 is close enough to one or more boundaries (e.g., 106) of the settings space. For example, a portion of the boundary of the first cluster 114 includes a region 118 outside the settings space 100. However, since no settings points outside the settings space 100 can be entered on the digital camera 10, no points will fall in regions 118 inside clusters but outside the settings space.

Figure 7:
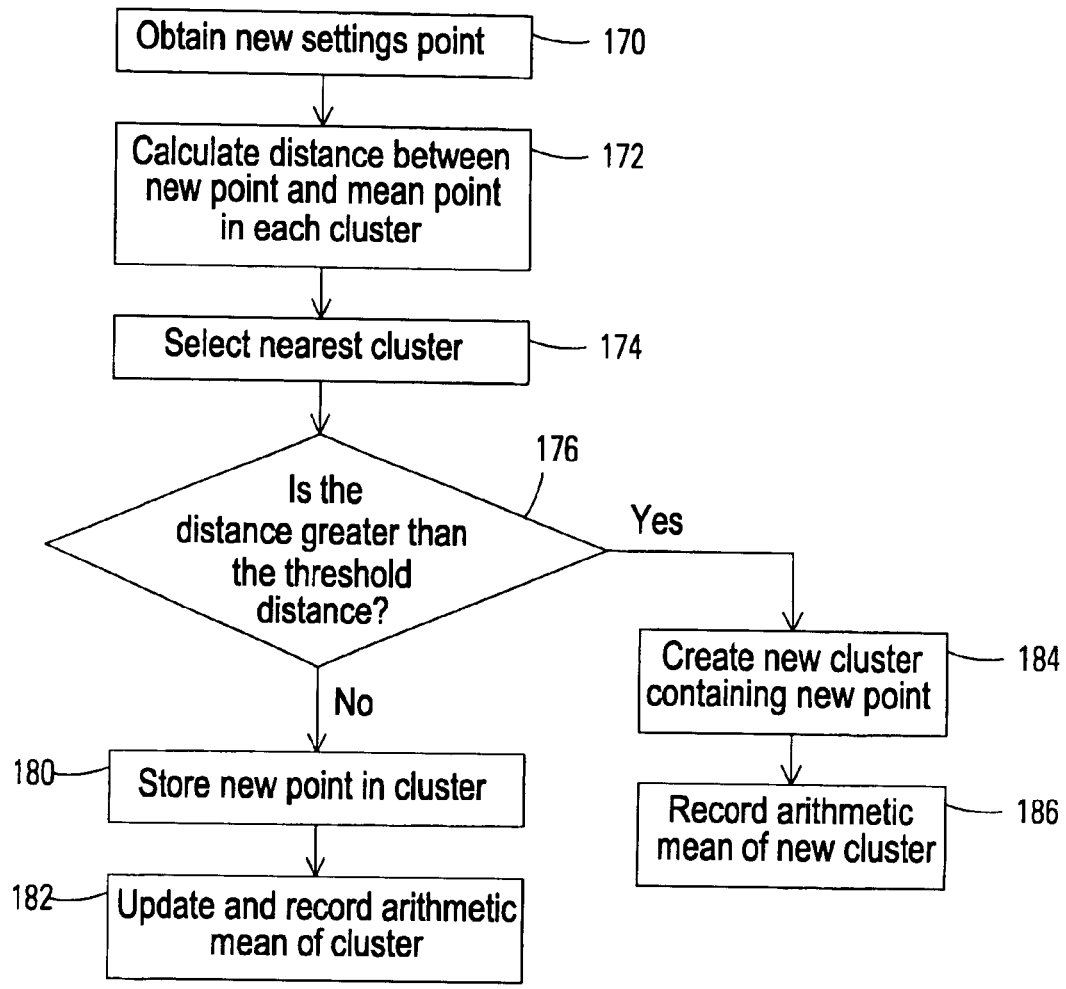
FIG. 7 is a flow chart illustrating the creation and maintenance of settings clusters in the case that the optimal point of a cluster is at the cluster's arithmetic mean.

Referring now to FIG. 7, this preferred clustering process will be summarized, for the embodiment in which the optimal point is at the arithmetic mean of a cluster. A new settings point is first obtained 170 when the user manually adjusts settings in the digital camera 10. The distance between the new settings point and the mean point in each cluster is then calculated 172. The algorithm used to calculate distance depends upon the number of dimensions in settings space, and the chosen geometry of the settings space. Suitable algorithms for calculating distance in different types of multidimensional space are well known, such as the square root of the sum of the squares to calculate distance in a Cartesian coordinate system $(((x2-x1)^2+(y2-y1)^2+(z2-z1)^2)^{1/2})$.

The cluster with the nearest mean point to the new settings point is selected 174, and the distance to this nearest mean point is compared 176 with the predetermined threshold distance. If the new settings point is within the threshold distance, the new settings point is stored 180 with the cluster, and the new arithmetic mean of the cluster is calculated and stored 182. If the distance between the new settings point and the nearest mean point is greater than the threshold distance, a new cluster is created 184 containing the new settings point, and the arithmetic mean of the new cluster is stored 186. (In this case, with only one point, the arithmetic mean is at the same location as the new settings point.)

Calculating and storing the arithmetic mean for a cluster when adding a new settings point speeds up later operations by avoiding the need to recalculate the mean over and over when changing modes on the digital camera 10 or when adding later settings points.

The number of previous settings states, or points, which are accumulated in the preferred embodiment may be limited by the available memory in the digital camera 10 or may be limited to a predetermined number to simplify clustering calculations.

Figure 8:
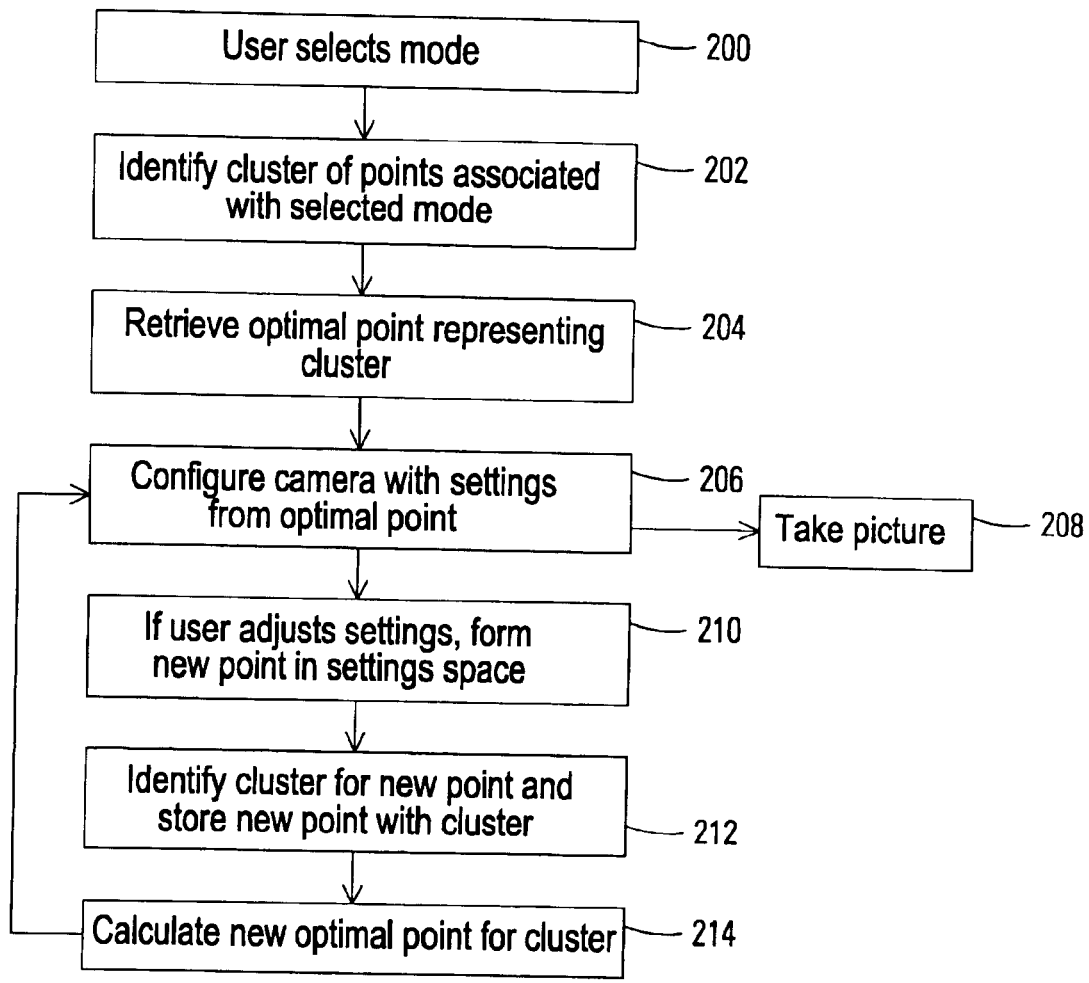
FIG. 8 is a flow chart illustrating a preferred adaptive and learning setting selection process in an imaging device which employs a cluster of previous settings to calculate optimal settings.
Figure 9:
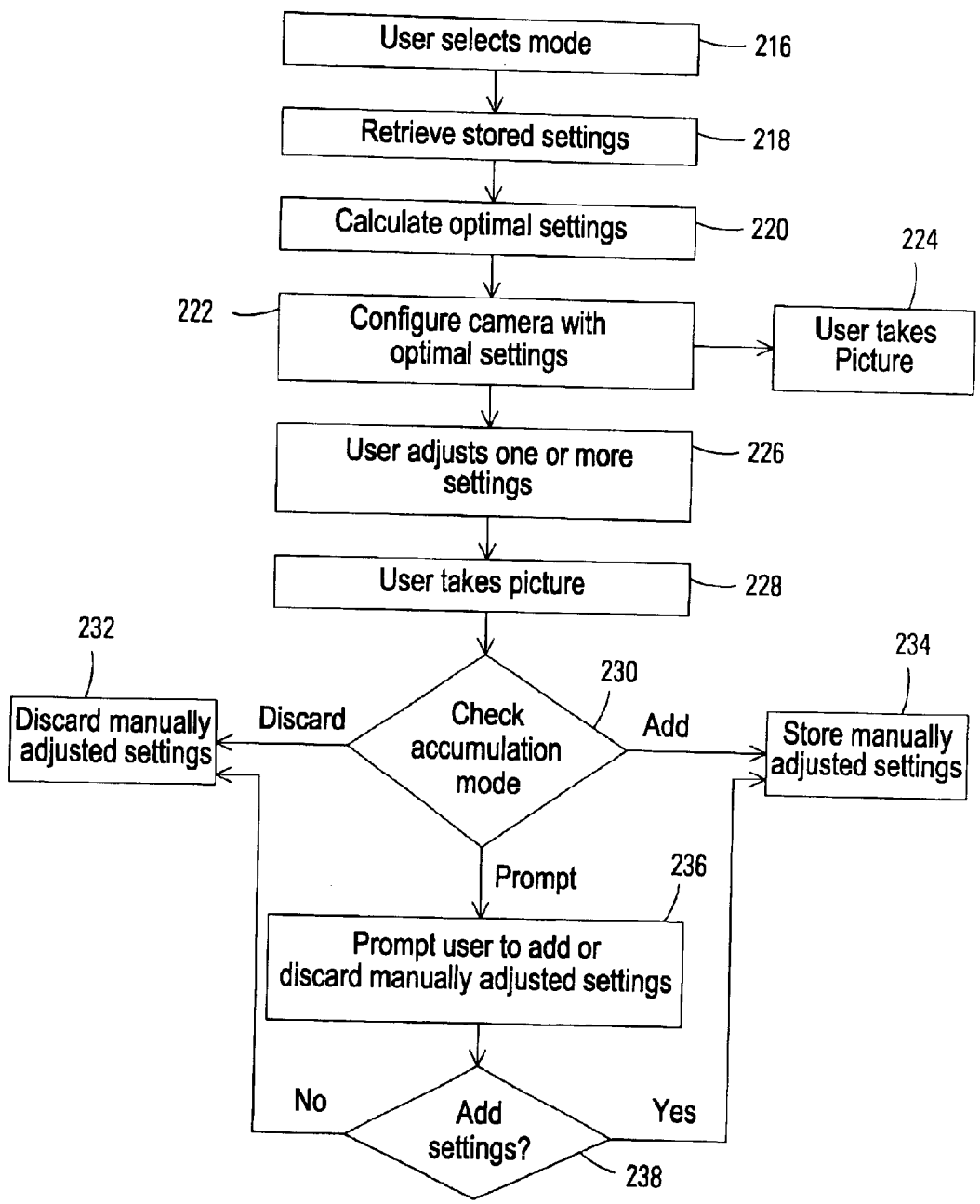
FIG. 9 is a flow chart illustrating an alternate preferred adaptive and learning setting selection process in an imaging device in which multiple previous settings are accumulated to calculate optimal settings.

The adaptive and learning setting selection process for the preferred embodiment in which multiple settings points are accumulated in clusters will now be summarized (see FIG. 8). As the user selects a mode 200, the cluster of settings points associated with that mode is identified 202. The optimal point representing the cluster is retrieved 204 if it was previously stored, otherwise it is calculated. The digital camera 10 is configured 206 with the settings represented by the optimal point. The user may take a picture 208 with the optimal settings at this point. If the user elects to manually adjust settings, a new point in settings space is formed 210 based upon the manually adjusted settings. The nearest cluster to the new point is identified or created, as described above with respect to FIG. 7, and the new point is stored 212 with the cluster. If the cluster is not the same as the beginning cluster of the second step 202, the mode on the digital camera 10 is changed. If the cluster is a new one, the user may be prompted to enter a name for a new mode associated with the new cluster. The optimal point representing the updated cluster having the new point is calculated 214, and the digital camera 10 is again configured 206 with settings represented by the optimal point.

The second preferred embodiment of the adaptive and learning setting selection process will now be discussed (see FIG. 10). In this embodiment, multiple settings points are accumulated, from which optimal settings are calculated. The digital camera 10 utilizing the adaptive and learning setting selection process is not immediately configured with the optimal settings when they are calculated. Rather, when a user manually adjusts settings in the digital camera 10 the optimal settings are calculated, but the digital camera 10 remains configured with the manual settings. The digital camera 10 is not configured with the new optimal settings until default settings are needed, such as when the mode is changed or when the digital camera is turned off and on again.

In this embodiment, manually adjusted settings are also not automatically stored. The digital camera 10 has three accumulation modes which determine whether new manual settings are stored or accumulated. In the first, new manually adjusted settings are automatically stored. In the second, new manually adjusted settings are automatically discarded. In the third, the digital camera 10 prompts the user to indicate whether to store or discard the new manually adjusted settings.

Figure 10:
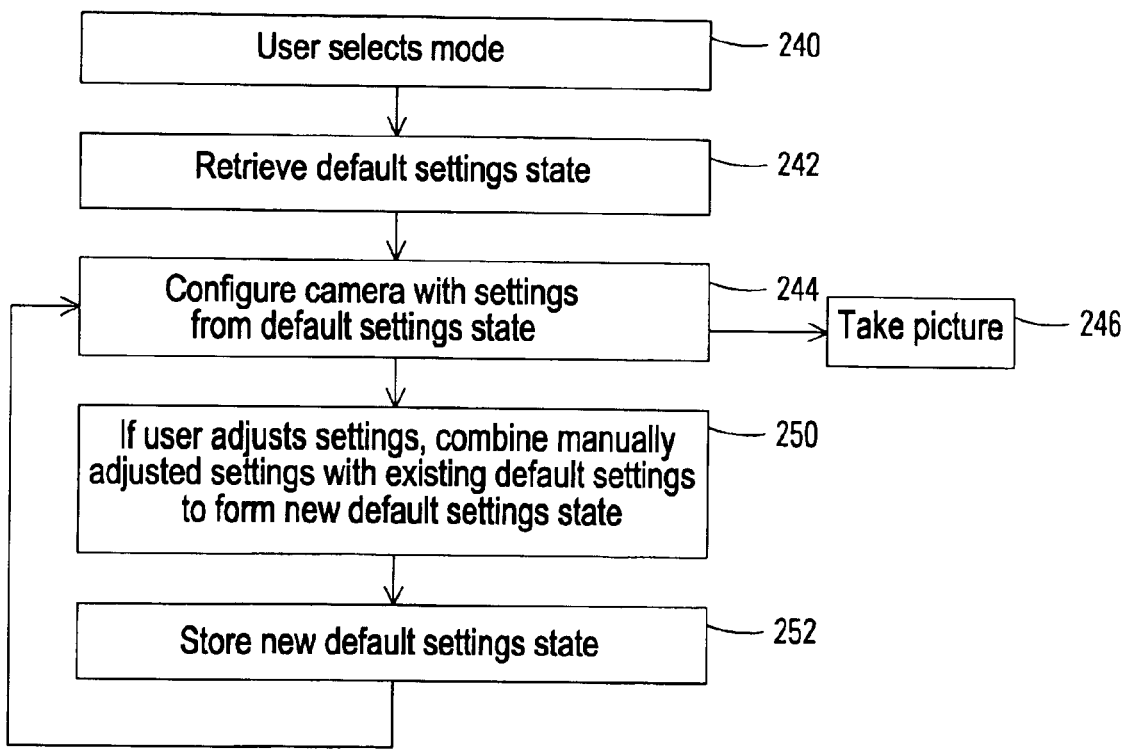
FIG. 10 is a flow chart illustrating an adaptive and learning settings selection process in an imaging device which combines the previous optimal settings with the current settings to calculate the new optimal settings.

This process is illustrated in FIG. 10. The user first selects 216 a mode, or turns on the digital camera 10 making it default to a mode. The stored settings associated with the mode are retrieved 218, and the optimum settings representing the stored settings are calculated 220. The digital camera 10 is configured 222 with the optimal settings, and the user may take 224 a picture. If the user manually adjusts 226 one or more settings, the digital camera 10 remains configured with the new manually adjusted settings, and the user may take 228 a picture. Taking 228 the picture triggers the digital camera 10 to continue with the settings storage process, so that the user can continue to manually adjust settings without storing settings before the adjustment process is complete.

The accumulation mode is checked 230 to determine whether to store the new manually adjusted settings. If the digital camera 10 is in Discard mode, the manually adjusted settings are discarded 232. In other words, the manually adjusted settings are not stored, even though the digital camera 10 remains configured with them until the mode is changed, the digital camera 10 is turned off, or new manually adjusted settings are entered. If the digital camera 10 is in Add mode, the new manually adjusted settings are stored 234 with previous settings. If the digital camera 10 is in Prompt mode, the user is prompted 236 to indicate whether to store or discard the new settings. If the user indicates 238 that settings should be stored, the new manually adjusted settings are stored 234 with previous settings. If not, the new manually adjusted settings are discarded 232.

The third preferred embodiment of the adaptive and learning setting selection process, in which only the most recent previous state is kept, will now be discussed (see FIG. 10). In this embodiment, the digital camera 10 stores only one default settings state for each mode. The default settings may be thought of as a point in settings space, as described above, or simply as a state of the settings. In either case, the calculations and results are the same. The digital camera 10 is configured with the default settings when turned on or when a mode is selected. New settings are combined with the default settings and the resulting settings are stored over the default settings. As a result, the default settings move over time to follow the user preferences. Each time new settings are to be combined with the existing default settings, new default settings are calculated which lie somewhere between the existing default settings and the new settings. For example, the existing default and new settings may be averaged, or the new default settings may lie between the existing default and new settings at a predetermined percentage of the distance between the two, such as at 30% of the distance from the existing default settings to the new settings.

This process is illustrated in the flow chart of FIG. 10. The user first selects 240 a mode, and the existing default settings state is retrieved 242. The digital camera 10 is configured 244 with the settings in the default settings state, and the user may take a picture 246 with the default settings. If the user adjusts the settings, the new manually adjusted settings are combined 250 with the existing default settings to form a new default settings state. The new default settings state is stored 252 over the previous default settings state. The digital camera 10 may be reconfigured 244 immediately with settings in the new default settings state. Alternatively, the digital camera 10 may be configured with the settings in the new default settings state after the mode is changed or the next time the digital camera 10 is turned on. This embodiment is especially well suited for imaging devices having a strong mode of preference rather than several distinct modes.

Aspects of an adaptive and learning setting selection process are also described in U.S. patent application entitled "ADAPTIVE AND LEARNING SETTING SELECTION PROCESS WITH SELECTABLE LEARNING MODES FOR IMAGING DEVICE" (Attorney Docket No. 10007731-1) of Daniel M. Esquibel, et al., filed concurrently herewith and which is incorporated herein by reference for all that it discloses.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of configuring settings in an imaging device, comprising:
retrieving at least one previous state of a plurality of settings in said imaging device;
determining a new state of said plurality of settings in said imaging device;
combining said at least one previous state with said new state to form an optimal state of said plurality of settings; and
configuring said settings in said imaging device according to said optimal state, wherein combining said previous state with said new state to form an optimal state comprises:
forming a point representing said new state in a settings space from said plurality of settings in said imaging device, at least one of said plurality of settings being user selected on said imaging device;
identifying a luster of points representing said at least one previous state in said settings space;
adding said point *n said settings space to said cluster of points; and
calculating an optimal point to represent said cluster of points, wherein said optimal point represents said optimal state.

2. The method of claim 1, wherein said calculating said optimal point comprises calculating an arithmetic mean point for said cluster of points.

3. The method of claim 1, wherein said settings space comprises a multidimensional space having a plurality of dimensions, and wherein each of said plurality of dimensions is defined by a corresponding one of said plurality of settings in said imaging device.

4. The method of claim 3, wherein each of said plurality of settings has a range of acceptable values with an upper limit and a lower limit, and wherein an upper boundary of each of said dimensions is defined by said upper limit of said corresponding one of said plurality of settings, and wherein a lower boundary of each of said dimensions is defined by said lower limit of said corresponding one of said plurality of settings.

5. The method of claim 1, wherein said imaging device has a plurality of modes each having at least one previous state of said plurality of settings, and wherein retrieving said at least one previous state of said plurality of settings comprises identifying one of said plurality of modes and retrieving said at least one previous state of said plurality of settings for said one of said plurality of modes.

6. The method of claim 5, wherein identifying said one of said plurality of modes comprises identifying a currently selected mode in said imaging device.

7. The method of claim 5, said imaging device having a cluster of at least one point in said settings space for each of said plurality of modes, and wherein identifying said one of said plurality of modes comprises selecting a nearest one of said clusters in said settings space to said point representing said new state and identifying one of said plurality of modes corresponding to said nearest one of said clusters as said one of said plurality of modes.

8. The method of claim 5, said imaging device having a cluster of at least one point in said settings space for each of said plurality of modes, and wherein identifying said one of said plurality of modes comprises creating a new mode containing said point representing said new state and identifying said new mode as said one of said plurality of modes if said point representing said new state lies at least a predetermined distance outside each of said clusters.

9. A method of configuring settings in an imaging device, comprising:
retrieving at least one previous state of a plurality of settings in said imaging device;
determining a new state of said plurality of settings in said imaging device;
combining said at least one previous state with said new state to form an optimal state of said plurality of settings; and configuring said settings in said imaging device according to said optimal state, wherein said previous state and said new state form locations in a state space defined by said plurality of settings in said imaging device, and wherein combining said previous state with said new state to form an optimal state comprises determining a location of said optimal state, wherein said optimal state location lies a distance from said previous state location along a direction from said previous state location toward said new state location so that said optimal state location lies between said previous state location and said new state location.

10. The method of claim 9, wherein said distance has a predetermined value.

11. The method of claim 9, wherein said distance lies a predetermined percentage of said distance between said previous state and said new state.

12. The method of claim 1, wherein said new state of said plurality of settings is selected in said imaging device by reading values for said plurality of settings from at least one control input on said imaging device.

13. The method of claim 1, wherein said new state of said plurality of settings is selected in said imaging device by:

presenting a plurality of sample images on said imaging device, wherein each of said plurality of sample images is generated based on variations of said plurality of settings; p1 determining which of said plurality of sample images was user selected; and selecting said plurality of settings according to settings corresponding to said user selected sample image.

14. The method of claim 1, wherein said new state of said plurality of settings is selected in said imaging device by reading values for said plurality of settings from a remote computer.

15. The method of claim 1, wherein said new state of said plurality of settings is selected in said imaging device by:

presenting a plurality of sample images on a remote computer, wherein each of said plurality of sample images is generated based on variations of said plurality of settings;

determining which of said plurality of sample images was user selected on said remote computer; and selecting said plurality of settings according to settings corresponding to said user selected sample image.

16. The method of claim 1, wherein said new state of said plurality of settings is selected in said imaging device by:

preparing a plurality of printed sample images, wherein each of said plurality of printed sample images is generated based on variations of said plurality of settings;

determining which of said plurality of printed sample images was user selected; and selecting said plurality of settings according to settings corresponding to said user selected printed sample image.

17. An electronic Imaging device, comprising:

an imaging system; and computer readable program code in said electronic imaging device, said computer readable program code comprising:

i) code for retrieving at least one previous state of a plurality of settings in said imaging device;

ii) code for determining a new state of said plurality of settings in said imaging device;

iii) code for combining said at least one previous state with said new state to form an optimal state of said plurality of settings; and iv) code for configuring said settings in said imaging device according to said optimal state, wherein said code for combining said previous state with said new state to form an optimal state comprises:

a) code for forming a point representing said new state in a settings space from said plurality of settings in said imaging device, at least one of said plurality of settings being user selected on said imaging device;

b) code for identifying a cluster of points representing said at least one previous state in said settings space;

c) code for adding said point in said settings space to said cluster of points; and d) code for calculating an optimal point to represent said cluster of points, wherein said optimal point represents-said optimal state.

18. An electronic imaging device, comprising:

an imaging system; and computer readable program code in said electronic imaging device, said computer readable program code comprising:

i) code for retrieving at least one previous state of a plurality of settings in said imaging device;

ii) code for determining a new state of said plurality of settings in said device;

iii) code for combining said at least one previous state with said new state to form an optimal sate of said plurality of settings; and iv) code for configuring said settings in said imaging device according to said optimal state, wherein said previous state and said new state form locations in a state space defined by said plurality of settings in said imaging device, and wherein said code for combining said previous state with said new state to form an optimal state comprises determining a location of said optimal state, wherein said optimal state location lies a distance from said previous state location along a direction from said previous state location toward said new state location so that said optimal state location lies between said previous state location and said new state location.

19. A digital imaging apparatus, comprising:

means for selecting a mode on said digital imaging apparatus;

means for adjusting a plurality of settings on said digital imaging apparatus; and means for tracking user preferences in said plurality of settings by storing previous settings states in said digital imaging apparatus as at least one cluster of points in a settings space.

* * * * *

UNITED STATES PATENT AND TRADEMARK OFFICE
CERTIFICATE OF CORRECTION

| | |
|---|---|
| PATENT NO. | : 6,914,624 B1 |
| APPLICATION NO. | : 09/712578 |
| DATED | : July 5, 2005 |
| INVENTOR(S) | : Daniel M. Esquibel et al. |

It is certified that error appears in the above-identified patent and that said Letters Patent is hereby corrected as shown below:

Column 1, line 59, after "adjusting the" delete ".".

Col. 12 (line 11), delete "luster" and insert therefor --cluster--.

Col. 12 (line 13), delete "*n" and insert therefor --in--.

Col. 13 (line 27), delete "p1".

Col. 13 (line 27), "determining" starts a new paragraph.

Col. 13 (line 58), delete "Imaging" and insert therefor --imaging--.

Col. 14 (line 23), delete "represents-said" and insert therefor --represents said--.

Col. 14 (line 33), between "said" and "device", insert --imaging--.

Col. 14 (line 35), delete "sate" and insert therefor --state--.

Signed and Sealed this

Twentieth Day of May, 2008

JON W. DUDAS
*Director of the United States Patent and Trademark Office*